United States Patent [19]

Hardies

[11] 3,974,693

[45] Aug. 17, 1976

[54] MULTIPLE TIME DIFFERENCE ULTRASONIC FLOWMETER

[75] Inventor: Charles E. Hardies, Severna Park, Md.

[73] Assignee: Westinghouse Electric Corporation, Pittsburgh, Pa.

[22] Filed: May 5, 1975

[21] Appl. No.: 574,671

[52] U.S. Cl. .............................................. 73/194 A
[51] Int. Cl.² ......................................... G01F 1/66
[58] Field of Search ................................. 73/194 A

[56] References Cited
UNITED STATES PATENTS

| | | | |
|---|---|---|---|
| 3,625,057 | 12/1971 | Yoshiyama et al. | 73/194 A |
| 3,653,259 | 4/1972 | McShane | 73/194 A |
| 3,678,731 | 7/1972 | Wells et al. | 73/194 A |
| 3,882,722 | 5/1975 | McShane | 73/194 A |

Primary Examiner—Charles A. Ruehl
Attorney, Agent, or Firm—C. M. Lorin

[57] ABSTRACT

An improvement in systems for measuring the rate of fluid flow in a pipe or an open unrestricted channel as a current at sea or ocean wherein the time delay between acoustic pulses transmitted upstream and downstream in a fluid passing along a path of travel is multiplied by repeated transmissions over predetermined time intervals. The correction for the speed of sound in the medium is founded on the realization that in a multiple time difference ultrasonic flowmeter, there is a pulse ($N_c \Delta t$) in the generated $N\Delta t$ train which is directly proportional to the velocity of the fluid. Accordingly, the time interval during which the train $N\Delta t$ last is automatically adjusted so that the time difference, or multiple of $\Delta t$, be in fact $N_c \Delta t$.

7 Claims, 7 Drawing Figures

MULTIPLE TIME DIFFERENCE ULTRASONIC FLOWMETER

BACKGROUND OF THE INVENTION

The usual time difference method in ultrasonic flowmeters involves the transmission of ultrasonic waves through a fluid medium in two directions, one upstream and the other downstream of the direction of flow, and comparing the transit times, normally over paths of equal lengths. Assuming that the speed of sound remains constant, the speed of propagation of the waves in the fluid medium is the same over both paths; and the transit time varies according to the velocity of the fluid medium which shortens the transit time over the downstream path and lengthens the transit time over the upstream path. From the difference between the upstream and downstream transit times, the flow velocity of the liquid medium can be calculated by a time difference technique.

The basic theory of the time difference technique can be explained as follows: Assume, for example, that a conduit having a uniform flow of fluid of velocity, $v$, contains two sets of transducers facing each other at a spacing, $d$, between the two. If the sound velocity in the fluid at rest is $c$, then the respective transit times downstream, $t_A$, and upstream, $t_B$, can be represented as follows:

$$t_A = \frac{d}{(c+v)} \quad (1)$$

and $$t_B = \frac{d}{(c-v)}. \quad (2)$$

If a pulse is simultaneously transmitted in both paths, the received signals arrive at times differing by:

$$\Delta t = t_B - t_A = \frac{2\,dv}{c^2 - v^2} \quad (3)$$

The velocity of the fluid, $v$, is almost always much smaller than the sound velocity, $c$, in the fluid at rest for all practical applications in liquids. For these applications, the approximate equation:

$$\Delta t = \frac{2\,dv}{c^2} \quad (4)$$

is sufficiently accurate. Thus, $\Delta t$ is proportional to $v$ with the calibration constant being a function of $c$, and $v$ can be determined from the relationship:

$$v = (1/2d)c^2 \Delta t \quad (5)$$

where $1/2d$ is a constant.

A problem arises, however, in that the speed of sound, in reality, is not constant but varies with the mineral content and temperature of the fluid being measured. This is particularly true when measuring the flow of a fluid in an open unrestricted channel of flow for instance, at sea.

Means have been proposed in order to compensate for the varying speed of sound. One type of compensating scheme is referred to in U.S. Pat. No. 3,440,876 entitled "Flowmeter Frequency Control System" of W. E. Hayes and C. D. Calhoun. The scheme utilizes a variable frequency oscillator (VFO) and a counter device which is responsive to the VFO output for providing a marker output signal when a certain count has been reached. The provision of this marker pulse is obtained by initially choosing a nominally correct speed of sound, determining how long it should take acoustic energy to travel the distance between transducer stations in the absence of fluid velocity, and knowing the frequency of the VFO, the marker pulse should occur at the same time the acoustic energy is received, and the count in the counter provides an indication of this situation. The VFO also feeds a time interval counter which is turned on, when the downstream acoustic energy is received, to provide a first received pulse, or signal, and is turned off, when the upstream acoustic energy is received, to provide a second received pulse, or signal. The count in the time interval counter is indicative of the fluid velocity. In order to control the frequency of the VFO, the marker pulse is compared with the first received signal.

As an improvement, Hayes uses the VFO to provide pulses to a counter for a period of time $\Delta T$ equal to the difference in transit time of the acoustic pulses travelling between upstream and downstream transducers. A first counter counts up the VFO output and provides a marker signal indicative of a received pulse in the absence of any fluid velocity. Another counter means stores a count indicative of one half the count in the $\Delta T$ counter and is provided with the VFO output such that when full it will provide a comparison signal when the $\Delta T$ is half full. The marker and comparison signals are utilized to control the frequency of the VFO.

In U.S. Pat. No. 3,653,259, of McShane issued Apr. 4, 1972, an ultrasonic flowmeter system based upon a time difference technique is described wherein the time delay between acoustic pulses transmitted upstream and downstream in a fluid passing along a path of travel is multiplied by repeated transmissions in sing-around fashion. This has the advantage of obviating the necessity for measuring very small differences between upstream and downstream transmissions to determine velocity, by merely using the cumulative effect in combining the time delays between upstream and downstream pulses over a chosen period of time.

Thus, the output from the system shown in U.S. Pat. No. 3,653,259 is proportional to the total time included in a series of ever-widening pulses. This technique will be referred to hereinafter as the McShane multiple time difference technique, in order to distinguish over those techniques in which only one time difference $\Delta t$ is measured. As explained in the McShane patent, instead of measuring a time difference $\Delta t$ between a single pair of received pulses, which would be very small, the quantity $\Delta t$ is expanded by repeated transmissions in sing-around fashion. Regenerative sing-around action is effected during a selected time interval T, the first transmitted pulse being generated in each loop. The sing-around loops continue to run for the chosen time T while counting for N pulses during such time interval T in each loop. As a result an output signal representing NΔt is derived instead of only Δt in amplitude.

However, since the McShane method only amplifies what each Δt provides, the same dependency upon the speed of sound c in the fluid exists in the NΔt derived signal. McShane therefore provides for "c-correction" of the NΔt pulse signal. Thus the McShane patent describes an improvement consisting in using the sum of the ever widening signals Δt rather than the last signal NΔt. This technique will be hereinafter called the "summation multiple time difference" (ΣNΔt) as opposed to the original multiple time difference (NΔt) technique of McShane. Therefore, when performing the summation of all of the pulses in the multiple pulse train, all NΔt pulses are in fact successively measured. Also, this sound velocity correction method is affected by an uncertainty due to a pulse edge effect appearing at the end of the train.

Another prior art mode of correction is described in U.S. Pat. No. 3,546,935 entitled "Fluid Measurement System and Method" of P. J. Bruha. This patent also utilizes a variable frequency oscillator to produce a frequency which is dependent upon the speed of sound, and uses this (VFO) frequency to correct the Δt in the conventional technique, or the N(Δt) in the multiple time difference technique of McShane. The difficulty with this mode of compensating for the speed of sound results from the fact that actually a separate measurement of the speed of sound is made. Such a measurement requires at least as much power as for a Δt measurement. In fact the VFO must run continuously. This is a waste of power.

It is therefore one object of the present invention to provide a system of the type described wherein correction for speed of sound variations is improved.

A further object is to provide a flowmeter system of the multiple time interval difference having an inherent compensation for variations in the speed of sound.

Another object of the present invention is to provide a sing-around flowmeter of improved accuracy and independent from the speed of sound.

The present invention being an improvement over the multiple sing-around flowmeter system described in U.S. Pat. No. 3,653,259 entitled "Ultrasonic Flowmeter Systems" of J. L. McShane, issued Apr. 4, 1972 and assigned to the same assignee as the assignee of this application, the text of the said patent is incorporated by reference in this application for the purpose of explaining more completely the supporting McShane multiple time difference technique as well as of complementing the description herein of the preferred embodiment of the present invention.

SUMMARY OF THE INVENTION

The present invention resides in using the multiple sing-around technique of U.S. Pat. No. 3,653,259 of J. L. McShane in such a way that correction for speed of sound variations is automatically obtained through extending the sing-around time interval by an amount calculated by a counter relative to a preset-count corresponding to a known speed of sound, so that the last and amplified time difference ($V_c\Delta t$) actually is a pulse that is directly proportional to fluid velocity.

THE MULTIPLE TIME DIFFERENCE TECHNIQUE OF U.S. Pat. No. 3,653,259

The usual principle of ultrasonic flowmeters involves the transmission of ultrasonic waves through a fluid medium in two directions, one upstream and the other downstream of the direction of flow, and comparing the transit times, normally over paths of equal lengths. The speed of propagation of the waves in the fluid medium is the same over both paths and the transit times varies according to the velocity of the fluid medium which shortens the transit time over the downstream path and lengthens the transit time over the upstream path. From the difference between the upstream and downstream transit times, the flow velocity of the liquid medium can be calculated by either a time difference of frequency difference technique.

In the usual frequency difference technique, the received pulse in each path is used to trigger another transmit pulse, thus generating a train of pulses in each path whose period equals the transit time. This is known as the sing-around method and the combination of circuitries, transducers and transmission paths for each pulse train is referred to as a sing-around loop. The repetition frequencies, $f_A$ for the downstream case and $f_B$ for the upstream case, are:

$$f_A = 1/t_A = (c+v)/d \text{ and } f_B = 1/t_B = (c-v)/d$$

and the frequency difference is:

$$\Delta f = f_A - f_B = 2v/d$$

Thus, the frequency difference is proportional to the velocity of the fluid, $v$, with no dependence on $c$, the sound velocity in the fluid at rest.

One important advantage of the time difference system as compared to the frequency difference system is fast response, since a velocity determination can be made each transmission interval. However, in the past, attempts to provide a time difference system have usually involved the measurement of the time difference between received pulses after a single transmission. This meant that very small time differences had to be measured, particularly at low velocities, and the system was dependent upon a determination of $c$, the sound velocity in the fluid at rest. The frequency difference method provides a relatively easily measured quantity and freedom from effects of the velocity in the fluid at rest, but has a very slow response time because of the long counting interval required to accurately determine a frequency difference for low velocities. Furthermore, the frequency difference method requires two pairs of transducers, to avoid the condition where a transducer tries to transmit and receive at the same time. The time difference system, on the other hand, can be implemented with one pair of transducers by switching the transducer function from transmit to receive after the pulses are transmitted.

With the multiple time difference flowmeter system, pulses are transmitted in both directions, using either two pairs of transducers, or a single pair. The received pulses in each path trigger transmit pulses in their respective paths in sing-around fashion, as in the frequency difference system. However, the repetition of pulses is not continuous as in the frequency difference system but terminates after a given number of transmissions in each direction. The time difference between corresponding received pulses in each path is measured. This time difference is expanded over the original time difference, and the expanded time difference is then measured to determine the rate of fluid flow.

The time difference between the last received pulse in one train of sing-around pulses, and the corresponding pulse in the other train is measured. This time difference expands by a factor equal to the number of occurring repetitions. The expanded time difference can be measured much more easily to a given accuracy than the time difference between the first set of received pulses.

Figure 1:
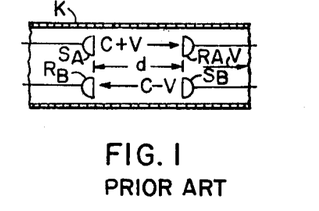
FIG. 1 is a schematic illustration of the basic transducer arrangement of an ultrasonic flowmeter.

The prior art system of multiple time difference flowmeter will now be described by reference to FIG. 1, 2 and 3 of the drawings. Transmitting transducers $S_A$, $S_B$ are disposed in contact with a fluid medium at two locations, and in relation as shown with receiving ultrasonic transducers $R_A$, $R_B$. The fluid is assigned to flow in the direction of arrow V at a velocity $v$. The ultrasonic transducer $S_A$ transmits in the direction of fluid flow, while transducers $S_B$ transmits against the stream.

From the afore-mentioned equation (5) it is seen that $\Delta t$ is proportional to $v$ with the calibration constant being a function of $c$; and under the conditions for which $v << c$, $v$ can be determined from the relationship:

$$v = (1/2d)c^2\Delta t \tag{6}$$

where $1/2d$ is a constant.

Figure 2:
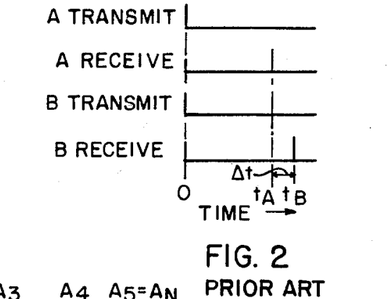
FIG. 2 illustrates time relationships of the received and transmitted pulses of the usual time difference system.

The time relationship of the transmitted and received pulses is shown in FIG. 2. The pulses from transducers $S_A$ and $S_B$ are transmitted simultaneously. However, the time $t_A$ required for the pulse to travel from transducer $S_A$ to transducer $R_A$ is less than the time $t_B$ to travel between transducer $S_B$ and transducer $R_B$ for the reason that the pulse from the latter sending transducer is travelling upstream. The difference in time between the received pulses is, therefore, $\Delta t$. Assuming that $\Delta t$ can be determined and that $c$ can also be determined, the velocity of the fluid passing through the conduit can be determined in accordance with equation (6) given above.

Figure 3:
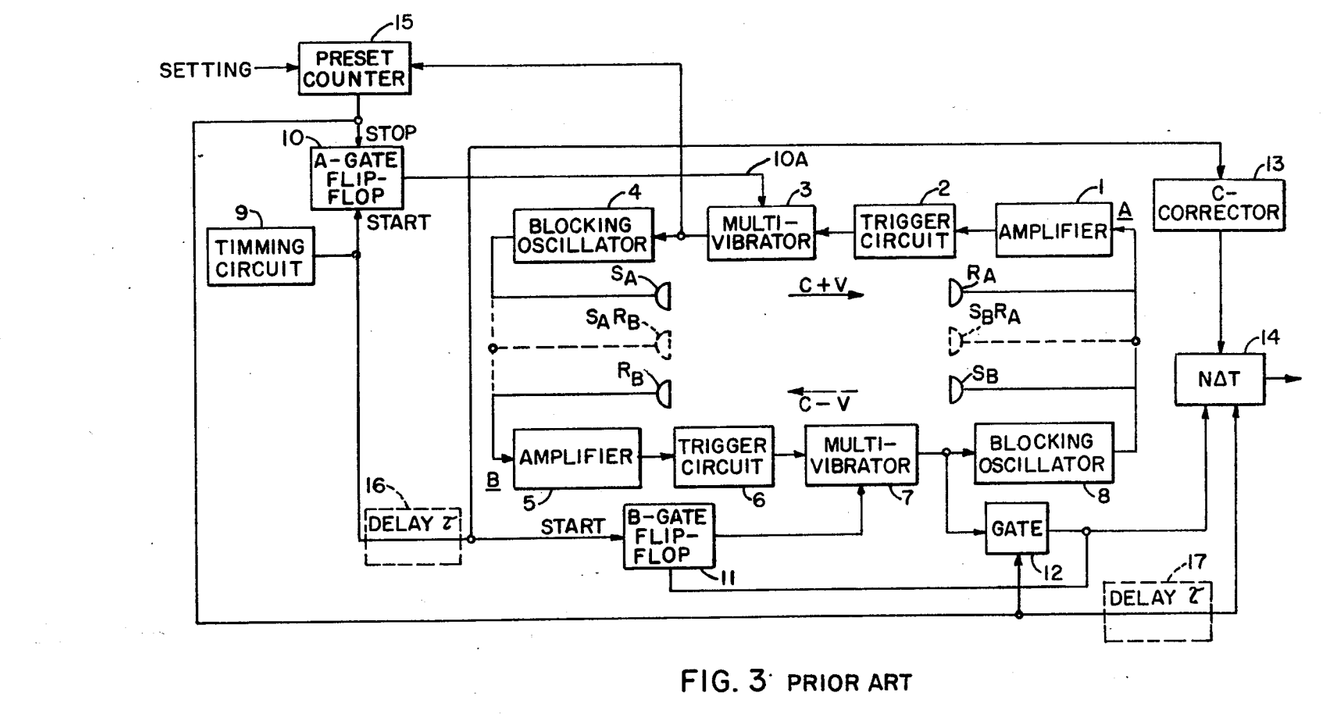
FIG. 3 is a schematic block diagram of the multiple time difference flowmeter system of the prior art.

Referring now to FIG. 3, transmitting transducer $S_A$ and receiving transducer $R_A$ are shown in association with a sing-around loop A including blocking oscillator 4, multivibrator 3, a trigger circuit 2 and an amplifier 1. Similarly, transmitting transducer $S_B$ and receiving transducer $R_B$ are shown in association with a sing-around loop B including blocking oscillator 8, multivibrator 7, trigger circuit 6 and amplifier 5. Loop A operates downstream, while loop B operates upstream.

The initial transmit pulse occurs coincidentally with the energizing of multivibrator 3 by a signal on lead 10A. Blocking oscillator 4 generates a pulse which shock excites $S_A$. The received signal at $R_A$ consists of a short burst of oscillations. This signal is amplified by amplifier 1, whose output causes trigger circuit to produce a trigger pulse at a predetermined portion of each received pulse, particularly the leading edge of the first or second half-cycle. This trigger signal causes astable multivibrator 3 to change states and the resulting multivibrator output triggers blocking oscillator 4, providing the regenerative sing-around action. The astable multivibrator 3 does not operate normally in the free-run mode but is synchronized at the higher sing-around repetition rate by pulses from trigger circuit 2. Its free-run capability is useful for self-restarting in the event an acoustic pulse is blocked, and for circuit testing purposes in the absence of a fluid path. Another function is provided by the astable multivibrator 3 by means of the interval during which the multivibrator remains in the state triggered by the pulse from circuit 2. During this interval, the mutlivibrator 3 is insensitive to trigger pulses generated by false signals at the amplifier input. One source of false signals is the occurrence of transmit pulses in the other sing-around loop, which in the two-transducer embodiment, are applied directly to the amplifier input. Sing-around loop B operates in an identical way.

Figure 4A:
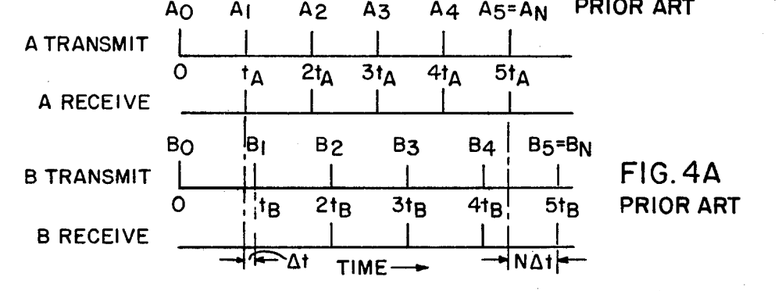
FIG. 4A and 4B illustrates time relationships of pulse trains in the operation of the system of FIG. 3.

Each interval of limited duration sing-around operation is started periodically by timing circuit 9, which provides a pulse which opens A gate 10 and B gate 11. Multivibrators 3 and 7 are gated ON and, as mentioned above, the first transmit pulse is generated in each loop. As the sing-around loops continue to run the multivibrator 3 output signal is fed to a preset counter 15 which counts each multivibrator 3 output transition which produces a blocking oscillator 4 output pulse. The initial transmit pulse is the $A_o$ pulse as the waveform in FIG. 4A shows, and the counter is preset so that the Nth pulse $A_N$ causes counter 15 to produce an output pulse, which closes A gate 10 and deenergizes multivibrator 3 and hence loop A. The waveforms of FIG. 4A, 4B assume that two pairs of transducers are being used. The Nth transmit pulse occurs (the initial one being called the Oth), but the sing-around loop A does not respond to the resulting received pulse. Counter 15 output also opens gate 12 so that the next transition of multivibrator 7 which corresponds to the Nth transmit pulse in loop B ($B_N$) is passed through the gate 12, all previous output signals from multivibrator 7 being blocked. The output of gate 12 closes B gate 11 and stops the sing-around action in loop B.

The counter 15 output pulse, i.e. the $A_N$ pulse is also fed to the $N\Delta t$ circuit 14, switching ON its output. The output of gate 12, being the $B_N$ pulse, is also fed to the $N\Delta t$ circuit 14, switching OFF its output. Thus, the $N\Delta t$ circuit 14 produces an output pulse of width equal to the separation between the $A_N$ and $B_N$ pulses, which is $Nt_B - Nt_A$. The flowmeter output is the average value of a repetitive series of $N\Delta t$ pulses. It will be appreciated that since the pulses fed to circuit 14 must each result from the Nth transmitted pulses, the cycle times for the individual loops must be such that one loop does not lead the other by more than one full cycle.

Figure 4B:
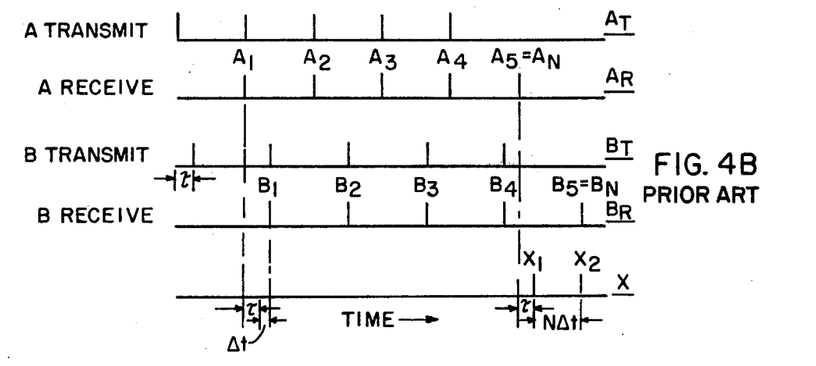

The preceding description of the system of FIG. 3 dealt with the case where two pairs of transducers are used. The modifications required for one pair of transducers are indicated by dashed lines in FIG. 3, and waveforms are shown in FIG. 4B. Transducers $S_A$, $R_B$ and $S_B$, $R_A$ are each connected to the output of one sing-around circuit and to the input of the other. The amplifier is designed to recover quickly from the overload presented by the other loop transmit pulse, and the operation of the multivibrators 3 and 7 as previously described prevents false triggering in either loop.

The circuit of FIG. 3 also includes a "c-correction" circuit 13 which determines the voltage level of the output of the NΔt circuit 14. The "c-correction" circuit is based on the following equations:

$t_A = d/(c+v)$ (1), $t_B = d/(c-v)$ (2), with $\Delta t = t_B - t_A = 2 dv/(c^2 - v^2)$ (3), and $t_A t_B = d^2/(c^2 - v^2)$ (7), from which $\Delta t = 2v \, t_A t_B/d$ (8), and $v = (d/2)(\Delta t/t_A t_B)$ which leads to $v \simeq d\Delta t/2 t_{NF}^2$ (10), where $t_{NF}$ = no-flow transit time. The "c-correction" circuit 13 generates an output voltage which varies proportionally to $C^2$ if in accordance with the exact equation (9) or, $(c^2 - v^2)$ if in accordance with the approximate equation (10). The "c-correction" output can be generated for each transmission or for each set of repetitions, sampling $t_{NF} = d/c$, or sampling $Nt_{NF}$ in these two alternatives.

It is also observed that the system of FIG. 3 is started and stopped, to establish cycle times for the individual loops during a period T. The cycle times of the individual loops must be such that one loop does not lead the other by more than one full cycle as can be readily seen from the pulse succession of FIGS. 4A, 4B.

DESCRIPTION OF THE PREFERRED EMBODIMENT OF THE INVENTION

The present invention is founded on the realization that the outputted multiple time difference pulse train contains a pulse, namely ($N_c\Delta t$) that is directly proportional to the velocity of the fluid and is independent of the speed of sound. As the speed of sound changes, the correct pulse ($N_c\Delta t$) occupies a different rank in the train. The invention provides for an automatic selection of ($N_c\Delta t$) as the speed of sound varies. The output represents a single pulse width ($N_c\Delta t$) which is proportional to the velocity of the fluid and independent of the speed of sound.

Figure 5:
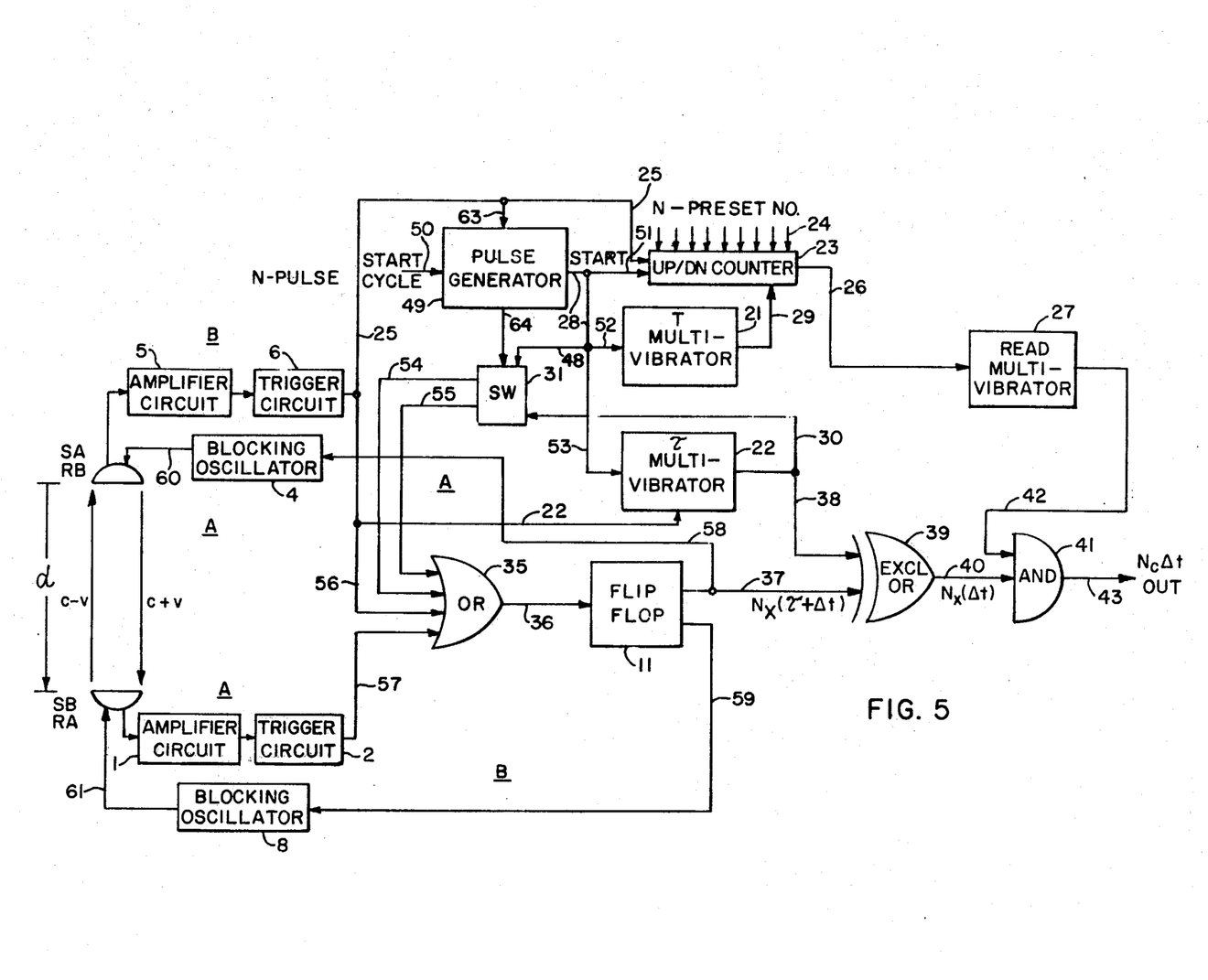
FIG. 5 is a schematic circuit diagram of one embodiment of the present invention.

Referring to FIG. 5 the circuit of the preferred embodiment differs from the prior art circuit of FIG. 3 by the addition of an up-down counter 23 and a READ multivibrator 27 used to select the final instant of the time Tc corresponding to pulse ($N_c\Delta t$), thereby extending the sing around period T by (Tc-T) and an AND circuit 41 enabled by the READ multivibrator 27 to gate the NcΔt pulse. The overall circuitry is simplified and provides material advantages as will appear from the following description.

Referring to FIG. 5, one specific embodiment of the invention is shown to include only one pair of transducers $S_A R_B$, $S_B R_A$ in the fashion indicated by dashed lines in FIG. 3, each transducer being connected to the output of one sing-around circuit and to the input of the other, as explained hereinabove. It is understood, however, that the invention is applicable as well as a circuit having two pairs of transducers instead of one. Also, as explained hereabove, in order to avoid interferences between the reception and transmission by one transducer for two different loops a delay τ is introduced so that the B loop, for instance, starts a time τ after the A loop starts.

Like reference numerals from FIG. 3 are used in FIG. 5 where the same electrical device is used. Thus, loop A includes: receiver $R_A$, amplifier circuit 1, trigger circuit 2, blocking oscillator 4, and transmitter $S_A$. Loop B includes receiver $R_B$, amplifier circuit 5, trigger circuit 6 and transmitter $S_B$ oscillator 8. Common to both loops is an OR device 35 and flip flop device 11. The two transducers $S_A$, $R_B$ and $S_B$, $R_A$ are apart by a distance d, and the direction of flow is as shown, the velocity being v and the speed of sound in the medium C. Thus acoustic transmission is aiding when it comes from transducer $S_A$ and opposing when it comes from transducer $S_B$.

The circuit of FIG. 5 includes a special arrangement for establishing in each loop a time of transmission lasting for a period T, and for creating a time delay τ between alternate transmissions by loops A and B. To this effect a T-multivibrator 21 and a τ-multivibrator 22 are provided each initially triggered from common line 28 and from respective input lines 52, 53 by the output of a pulse generator 49 which may be a multivibrator. The start signal on line 28 is also sent as input to a switch circuit (S.W.), which when closed passes the signal on line 54 to an OR device 35. The output line 30 from multivibrator 22 also is fed to the OR device 35 through switch circuit 31 when the latter is closed. The switch circuit 31 is enabled, e.g. closed, at the start of the operation, via line 64 derived from the pulse generator 49, and disabled, e.g. open, via control lines 25 and 63 to the pulse generator 49 and line 64 to the switch circuit 31 once the two transmission and reception cycles are running in loops A and B, alternately. The τ-multivibrator is initially triggered on line 53, at the start, and is triggered again thereafter via line 62 upon each acoustic wave being received in loop B, namely the loop which is delayed by τ relative to loop A.

When the sing-around operation has to be started, a command is applied on line 50 to the pulse generator 49. As a result, the two multivibrators 21, 22 are triggered from line 28, and such triggering is also transmitted by the switch circuit SW since the latter is closed, via lines 54, 55 and through the OR device 35, to flip flop device 11 which is tripped. Transmission in loop A is thus initiated by a pulse on blocking oscillator 4 via line 58.

After the time period τ has elapsed following the first transmission by transducer $S_A$, the τ multivibrator 22 relaxes and generates via line 48, switch circuit 31 and line 55 a control signal which via the OR device 35 and line 36, flips the flip flop device, so that a signal on line 59 excites the blocking oscillator 8 and triggers transducer $S_B$ via line 61 (for loop B). Now, at time $B_o$ following instant $A_o$ by exactly a time τ, transducer $R_B$ receives the transmitted wave of loop B. When this occurs, a control signal carried via line 25 from trigger circuit 6 of loop B onto line 63 to the pulse generator 49 causes a disabling signal to appear on line 64 to the switch circuit (SW) 31. As a result, switch 31 (SW) is opened and the multivibrator 22 and pulse generator 49 have no longer any effect on the transmission-reception cycles. From this time on, through the complete cycle, switch 31 is open and loops A and B are cycling by themselves in a sing-around fashion while flip flop 11 is flipping in accordance with the received pulse signals $A_o$, $A_1$, ... $B_o$, $B_1$, ... on lines 57 (loop A) and 56 (loop B), respectively. Thus flip flop device 11 assumes the successive states shown by curve (e) of FIG. 6. When a transmitted acoustic wave is received by $R_A$ at time $A_o$ shown by curve (c) in FIG. 6 for loop A the received acoustic signal is fed back into loop A to the flip flop device 11, via line 57 and the OR device 35. When flip flop device 11 has been tripped by the received wave, flip flop device 11 is in fact assuming the state shown by curve (e). As in the McShane patent, the state of flip flop device 11 defines an increasing time interval $\tau, \tau + \Delta t, \tau + 2\Delta t, \ldots \tau + N\Delta t$, representing the widening time difference between pulses $(A_o, B_o), (A_1, B_1), (A_N, B_N)$.

FIG. 5 shows how at the output of the flip flop device 11, the time interval introduced at the transmission is subtracted from each successive interval. To this effect an exclusive OR device 39 is provided which is receiving on input line 37 the $N_x(\tau + \Delta t)$ pulses, and on input line 38 the digital output of the $\tau$ multivibrator 22. Therefore, device 39 effects the difference between these two pulses, thus providing the true time differences measured $0, \Delta t, 2\Delta t, \ldots N\Delta t$. In other words, to a pulse $N_x(\tau + \Delta t)$ on line 34, corresponds a pulse $N_x(\Delta t)$ on line 40.

Thus a series of logic states each representing one of the multiple time differences $(N_x \Delta t)$, are successively assumed on line 40. At the output 43 of AND device 41 which is the outputted velocity measurement in the flowmeter, will appear only one time difference mainly the selected one $(N_c \Delta t)$, as will be shown hereinafter.

The present invention rests on the fact that of all the pulses such as $(N_x \Delta t)$ there is one $(N_c \Delta t)$, trip in the $N\Delta t$ train that is directly proportional to the velocity of the fluid during successive sing-arounds. As the speed of sound changes, that particular pulse $(N_c \Delta t)$ is no longer the same, e.g. does not occupy the same position in the train. Nevertheless, that particular output quantity is a relatively large pulse which is easily processed. By selecting this particular pulse, e.g. a pulse is obtained which does not depend on the speed of sound. Accordingly, correction for changes in the speed of sound is no longer necessary.

The main circuit providing the selection criteria is counter 23 of FIG. 5. As a result of the addition of this counter, sound correction is not required, in particular correction by the summation multiple time difference method of the McShane patent is not needed. A clear advantage is that the smaller time differences $N\Delta t$ are not measured, in contrast to the summation multiple time difference method. The end result is a new circuit, which is less complex and provides automatic speed of sound correction.

The single pulse of width $(N_c \Delta t)$ to be selected which is proportional to the velocity of the fluid, and is independent of the speed of sound, is, according to the present invention, automatically selected by determining the variance in the speed of sound during a chosen time period T, and by extending the duration of sing-around transmissions and receptions, e.g., by a proportionate amount. The last $\Delta t$, namely $N_c \Delta t$, is then proportional to the velocity of the fluid.

The sing-around time in loop A and B are $$t_A = \frac{d}{C+V} \quad (1) \quad t_B = \frac{d}{C-V} \quad (2)$$

where $d$ is the transducer separation in meters, $C$ is the speed of sound in meters/seconds, and $V$ is the fluid flow velocity in meters/second.

The time differential between pulses in the opposite direction $(\Delta t)$ is $$\Delta t = t_B - t_A = \frac{d}{C-V} - \frac{d}{C+V} = \frac{2dV}{C^2 - V^2} \quad (3)$$

In practice, the relative magnitudes of $C^2$ and $V^2$ are of the order of $(1500)^2$ and $(3)^2$, respectively so that equation (3) reduces to $$\Delta t = \frac{2dV}{C^2} \quad (4)$$

For N sing-arounds, the Nth sing-around provides a time interval $$N\Delta t = \frac{2dVN}{C^2} \quad (11)$$

The number of sing-arounds which occur in the time T is $$N = \frac{T}{t_A} = T/d/C + V = \frac{T(C+V)}{d} \quad (12)$$

which due to the differences in magnitude between C and V reduces to $$N = \frac{TC}{d} \quad (13)$$

Substituting (13) into (11) gives, $$N\Delta t = \frac{2TV}{C} \quad (14)$$

$$V = \frac{N\Delta t}{2} \cdot \frac{C}{T} \quad (15)$$

This is the equation which characterizes the multiple time difference system of the McShane patent. The system according to the present invention automatically eliminates C as a variable in equation (15). The invention rests on the fact that in the $N\Delta t$ pulse train there exists all multiples of $\Delta t$, namely $\Delta t, 2\Delta t, 3\Delta t, \ldots N\Delta t$, any value of N being fixed by choosing a proper value of T. The effect of the variations in the speed of sound C can be eliminated by choosing various values for T and thus various $N\Delta t$ pulses.

First assume that the $N\Delta t$ pulse is identified by $$N_x \Delta t = 2 T_x V/C \quad (16)$$

then, assume two values for the speed of sound namely $C_{min} = 1402$ m/sec (distilled water at 28°F) and $C_{max} = 1560$ m/sec (41 ppt salinity at 100°F), with a nominal transit time of 1500 m/sec.

$$\frac{C_{max}}{C_{min}} = \frac{1560}{1402} = 1.11 = 111\% \quad (17)$$

Over the range of C, $N\Delta t$ must be held constant. To do this equation 16 is used twice as follows:

$$N_1 \Delta t = \frac{2T_1 V}{C_1} \quad (18)$$

Where $T_1$ represents the time interval for the speed of sound $C_1$ and a pulse $N_1$ of rank.

$$N_2 \Delta t = \frac{2T_2 V}{C_2} \quad (19)$$

Moreover $C_1$ and $C_2$ according to (17) are related as follows:

$$C_2 = 1.11 C_1 \quad (20)$$

Substituting:

$$1.11 \frac{2T_1 V}{N_1 \Delta t} = \frac{2T_2 V}{N_2 \Delta t} \quad (21)$$

If $N\Delta t$ is independent of C as required, $N_1 \Delta t = N_2 \Delta t$ and (15) reduces to $$1.11 T_1 = T_2 \quad (22)$$

Referring back to equation (13), the number of sing arounds (N) in a fixed T is directly proportional to C.

$$N_1 = \frac{TC_1}{d} \quad (23)$$

$$N_2 = \frac{TC_2}{d} \quad (24)$$

where $C_2 = 1.11 C_1$; therefore $$N_2 = 1.11 N_1 \quad (25)$$

which indicates that by counting what the value of N is in the fixed T, the change in the speed of sound C is translated into a change of the measurable quantity N. N, at any given C, is directly proportional to T. Thus having determined the change in N, in the fixed interval T, when a corresponding amount of time is added to the fixed value of T, equation (15) becomes:

$$V = \frac{N \Delta t}{2} \times \frac{C + (\Delta C)}{T_1 + (T_2)} = \frac{N\Delta t}{2}$$

where $$\frac{C}{C + (\Delta C)} = \frac{T_1}{T_1 + (T_2)} = \frac{N_x}{N_x + \Delta N}$$

N is modified by $\Delta N$ so that the equation remains a true identity.

Figure 6:
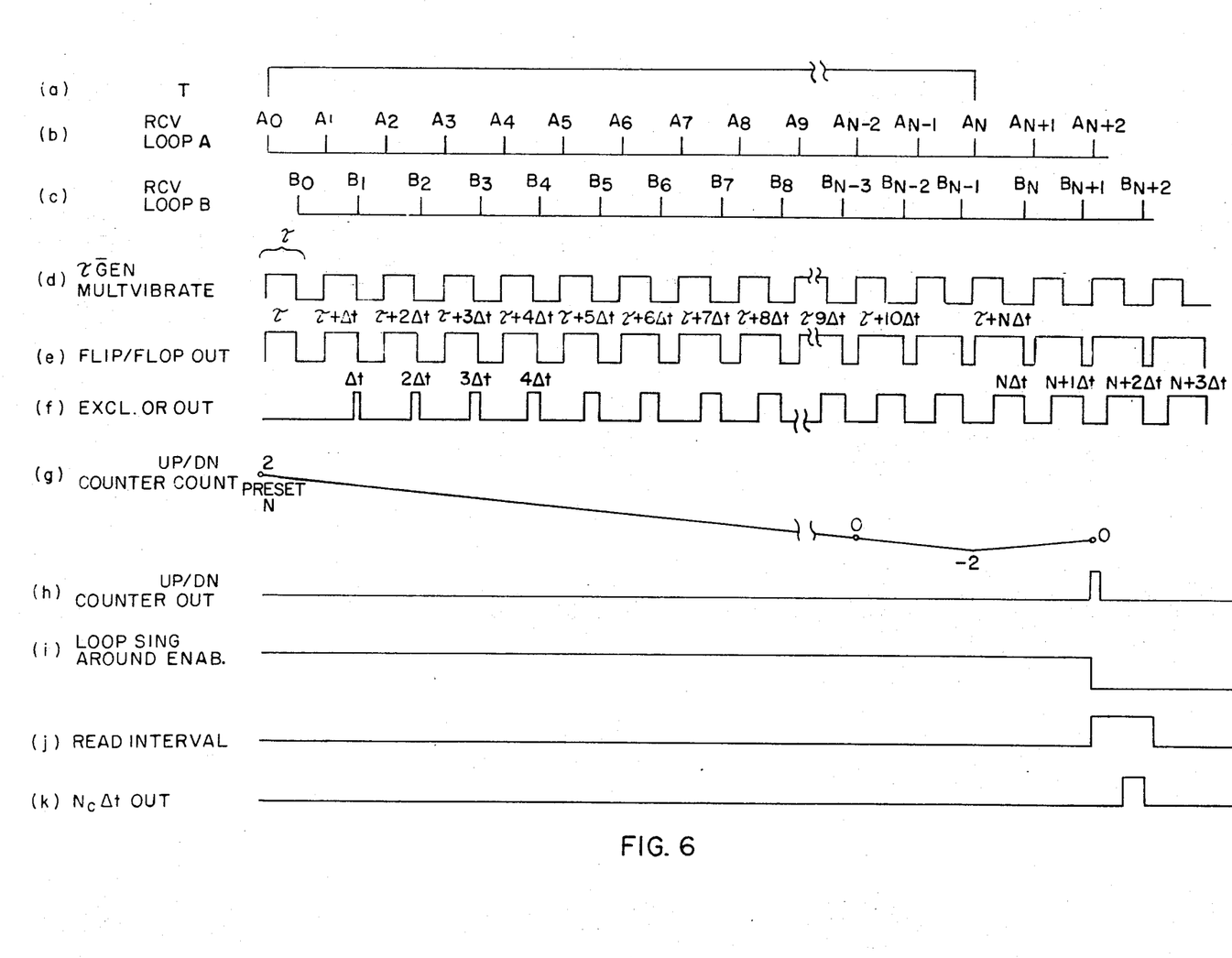
FIG. 6 comprises waveforms illustrating the operation of the circuit of FIG. 5.

The main feature according to the present invention will now be described by reference to the up/down counter 23, the READ multivibrator 27 and the AND device 41 shown on FIG. 3, and also by reference to curves (a), (b), (c), and (f) to (k) of FIG. 6.

The output from the trigger circuit 6 in loop B is carried via additional line 25 into an up/down counter 23. This up/down counter typically is a monolithic binary device known on the open market as a CSN74C193, but it could also be of the decade type. A number N is preset by the operator on digital lines 24. This preset number N is latched into the counter when the apparatus operation is started, e.g. on line 28 from the pulse generator 49 a latching signal is applied via line 51, to counter 23. From line 25 during sing-around, the successive pulses $B_o$, $B_1$ ... $B_N$ of curve (c) of FIG. 6 are received and counted by counter 23. While a given number N has been preset, the count accumulates, when N is matched up the count is zero.

It is assumed now that N has been selected to be a number of pulses corresponding to a time period T for which $N\Delta t$ represents exactly the velocity of fluid when the speed of sound in the fluid has the minimum value possible under the anticipated conditions of operation of the apparatus. It is now assumed that when the apparatus is being run the speed of sound has increased. When c increases, more sing-arounds take place in the given time T. If it is so, the counter will have to count more pulses $B_o$ than N indicates on the counter. In other words, within the time T, more pulses $B_o$ take place than at minimum speed of sound. Therefore the count in counter 23 will pass zero and negative counts will accumulate. This is shown by curve (g) of FIG. 6. When the time interval T defined by the multivibrator 21 terminates, the counter has in fact counted $N + \Delta N$ pulses, thus $\Delta N$ pulses more than the preset count N from line 24. At the moment the T multivibrator 21 relaxes, a signal on line 29 controls the counter 23 so as to count in the reverse direction. In other words counter 23 continues to count, but this time retracing the $\Delta N$ count back to zero (see FIG. 6 and curve (g)). It should be remembered that after the first transmission and reception ($A_o, B_o$) the switch circuit SW (31) has been disabled from line 64. Therefore, it becomes immaterial that multivibrator 22 be in the ON or in the OFF state at the output 48.

Thus, when multivibrator 22 relaxes transducers $S_A$, $R_B$ and $S_B$, $R_A$ continue to sing-around, and the pulses $B_o, B_1 \ldots B_N$ continue to appear on line 25 and to be counted by counter 23. It is also remembered that the AND device 41 from the start does not allow the signal ($N_x \Delta t$) to pass on line 43, as long as the device is disabled by the digital signal on line 42. It is an inherent feature of counter 23 that when the counter passes by zero for the second time (see FIG. 6 and curve (g) while counting $\Delta N$ in the reverse direction, a definite signal appears on line 26 at the output. This signal is used to control a READ multivibrator 27 so that an ENABLE pulse (see FIG. 6 curve (j)) appears on line 42. It is within the window defined by the READ multivibrator 27 that the AND device 41 is able to pick-up the coming $N_x \Delta t$ signal on line 40, which in fact at that moment is the $N_c \Delta t$ which was to be selected.

It is clear from the explanations given hereabove, that the sing-around cycle is longer by $\Delta N$ than the time $T_1$ corresponding to the right velocity of sound. $T_2 + \Delta T$, where $\Delta T$ is the time of sing-around so extended by allowing the counter to count $\Delta N$ additional pulses, is the correct time interval for transmission of the $N_c \Delta t$ pulse which verifies equation (16).

Although the preferred embodiment uses as a preset number N for the up/down counter 23 a number which corresponds to the minimum speed of sound anticipated in the fluid to be tested, the invention can also be carried out with a preset number corresponding to a maximum speed of sound. In this case, the sing-around operation will proceed until counting reaches the too large number N which has been preset. However, by storing the different time difference signals received on line 37, (for instance by circulating such data in a delay line), and by counting a smaller number of pulses within a smaller time period T, a relation of proportionality can be automatically derived for the selection of the appropriate $N_c \Delta t$ among the different signals $N_x \Delta t$ stored.

As earlier observed, in the McShane patent the $N\Delta t$ time difference cannot be enlarged too much so as to exceed a spacing between pulses ($A_o, A_1, \ldots B_o, B_1 \ldots$) which corresponds to the transit travel time in the fluid at rest, since at that moment the advancing and retarding effect on the pulses due to fluid flow will appear as reversed. The sampling of the time differences appearing on line 40 must be reduced in this event. The maximum possible number of samples to be derived depends on the velocity of the fluid and on the spacing between transducers. Indeed, a smaller number of samples reduces the accuracy of the measurement. The preset number N is selected in correlation with the time interval T. If N must be smaller, T will be chosen smaller, and conversely. In any case a relation of proportionality such as shown by equations (23), (24), and (25) can always be automatically derived in accordance with the present invention.

The invention is applicable to measurement of fluid flow not only in a pipe, a closed or open conduit, but also in an unrestricted channel such as a current at sea or in the ocean.

I claim:

1. In a flowmeter of the type wherein at least one pair of oppositely disposed ultrasonic transducer means are located in acoustic contact with a fluid stream and in upstream-downstream relation thereto; first feedback means connecting the output of a first of said transducer means to the input of a second of the transducer means such that upon one acoustic signal being transmitted upstream from the second transducer means to the first transducer means the transmission of another acoustic signal upstream is initiated from said second transducer means when said one upstream acoustic signal is received by said first transducer means, thus generating an upstream train of acoustic signals in sing-around fashion and a first corresponding series of pulse signals is generated in said first feed-back means; a second feedback means connecting the output of said second transducer means to the input of said first transducer means such that upon one acoustic signal being transmitted downstream from said first transducer means to the second transducer means the transmission of another acoustic signal downstream is initiated from said first transducer means when said one downstream acoustic signal is received by said second transducer means, thus generating a downstream train of acoustic signals in sing-around fashion and a second corresponding series of pulse signals is generated in said second feedback means;

gating means for causing said upstream and downstream train of acoustic signals to occur between said first and second transducer means each during a predetermined time interval;

means responsive to said first and second series of pulse signals for deriving successive elementary time intervals between opposite pulses of said first and second series of pulses, said elementary time interval increasing by Δt increments from one received acoustic signal to the next; the combination of:

counting means responsive to one of said first and second series of pulses for counting the pulses in the corresponding one of said feedback means during said predetermined time interval, and responsive to a reference count for comparing the count of pulses during said predetermined interval with said reference count for deriving a count error representative of speed of sound variation in said fluid relative to a reference speed of sound, means for extending the sing-around operation of said transducer means beyond said predetermined time interval during an additional time interval to provide additional pulses equal in number to said count error, and output means responsive to said elementary time interval deriving means for providing a representation of the last of said elementary time intervals as an indication of fluid velocity.

2. The flowmeter of claim 1 wherein said counting means is a digital up/down counter having a preset digital number equal to said reference count, whereby said count error is accumulated by said counter after counting up to said preset number, wherein said count error is determined by the termination of said predetermined time interval, and wherein said counter is responsive to termination of said predetermined time interval to count said accumulated count error, said output means being enabled upon completion of said error count.

3. The flowmeter of claim 2, wherein first multivibrator means is provided for establishing said predetermined time interval during an ON state of operation, the operation of said sing-around transducer means being initiated by said first multivibrator means being transferred from the OFF state to the ON state thereof; and the operation of said counter being reversed in response to said first multivibrator means being transferred from the ON state to the OFF state thereof.

4. The flowmeter of claim 3, wherein said output means includes an AND device, said AND device being enabled by said counter upon completion of said error count.

5. The flowmeter of claim 4, wherein second multivibrator means is provided for establishing a delay between two successive transmissions by said first and second transducer means;

means being provided responsive to said second multivibrator means for subtracting said delay from each of the derived elementary time intervals.

6. The flowmeter of claim 5, wherein said subtracting means includes an Exclusive OR device responsive to said elementary time intervals deriving means and to said second multivibrator means.

7. The flowmeter of claim 6, wherein said elementary time intervals deriving means includes a flip flop device alternately responsive to said first and second series of pulses of said feedback means.

* * * * *